United States Patent
Backes et al.

(10) Patent No.: US 11,609,585 B2
(45) Date of Patent: Mar. 21, 2023

(54) REVERSE MODULATION VALVE ASSEMBLY INCLUDING DEADBAND STATE

(71) Applicant: MICO, INC., North Mankato, MN (US)

(72) Inventors: Peter Backes, North Mankato, MN (US); Derek Tomhave, North Mankato, MN (US); Nathan Grotz, Nonrth Mankato, MN (US)

(73) Assignee: ZF OFF-HIGHWAY SOLUTIONS MINNESOTA INC., North Mankato, MN (US)

( * ) Notice: Subject to any disclaimer, the term of this patent is extended or adjusted under 35 U.S.C. 154(b) by 128 days.

(21) Appl. No.: 17/104,326

(22) Filed: Nov. 25, 2020

(65) Prior Publication Data

US 2021/0165431 A1  Jun. 3, 2021

Related U.S. Application Data

(60) Provisional application No. 62/942,053, filed on Nov. 29, 2019.

(51) Int. Cl.
*B60T 11/28* (2006.01)
*G05D 16/16* (2006.01)
*F16K 31/122* (2006.01)
*G05G 5/05* (2006.01)
(Continued)

(52) U.S. Cl.
CPC ............ *G05D 16/166* (2013.01); *B60T 11/18* (2013.01); *F16K 31/1221* (2013.01); *G05G 5/05* (2013.01); *B60T 7/04* (2013.01); *B60T 11/28* (2013.01)

(58) Field of Classification Search
CPC .......... B60T 11/28; B60T 11/18; B60T 11/30; F16K 31/1221; F16K 31/122
See application file for complete search history.

(56) References Cited

U.S. PATENT DOCUMENTS 2,185,264 A * 1/1940 Mistral ................. B60T 11/224
  92/30
4,230,152 A * 10/1980 Carl ........................ B60T 13/16
  192/12 C
(Continued)

FOREIGN PATENT DOCUMENTS

JP  2015102012 A  6/2015

OTHER PUBLICATIONS

Machine assisted English translation of JP2015102012A obtained from https://patents.google.com/patent on Sep. 13, 2022, 8 pages.

*Primary Examiner* — Brian J McGovern
(74) *Attorney, Agent, or Firm* — Warner Norcross + Judd LLP

(57) ABSTRACT

A valve assembly is provided. The valve assembly includes a valve body defining a bore. The valve assembly further includes a pull rod disposed in the bore and defining a bolt cavity. The pull rod is moveable between a first pull rod position and a second pull rod position. The valve assembly further includes a bolt disposed in the bolt cavity and moveable with respect to the pull rod between a first bolt position and a second bolt position. The valve assembly further includes a spool disposed in the bore. The spool is operatively coupled to the pull rod to move between an energized position and a neutral position.

20 Claims, 3 Drawing Sheets

(51) Int. Cl.
  *B60T 11/18* (2006.01)
  *B60T 7/04* (2006.01)

(56) References Cited

U.S. PATENT DOCUMENTS

| | | | | |
|---|---|---|---|---|
| 4,425,938 | A * | 1/1984 | Papa | F16K 31/363 |
| | | | | 137/489 |
| 4,569,271 | A * | 2/1986 | Reynolds | F16D 25/126 |
| | | | | 91/422 |
| 5,106,168 | A * | 4/1992 | McKay | B60T 8/1831 |
| | | | | 303/22.7 |
| 5,813,230 | A * | 9/1998 | Hartl | B60T 11/16 |
| | | | | 60/591 |
| 6,217,128 | B1 | 4/2001 | Tillman, Jr. | |
| 6,364,280 | B1 * | 4/2002 | Stach | F16K 11/07 |
| | | | | 137/625.69 |
| 6,568,768 | B1 * | 5/2003 | Oka | B60T 17/221 |
| | | | | 303/114.3 |
| 10,626,892 | B1 * | 4/2020 | Zähe | F15B 13/0433 |
| 2003/0178272 | A1 * | 9/2003 | Kusano | B60T 17/02 |
| | | | | 188/358 |
| 2004/0144090 | A1 * | 7/2004 | Ogura | B60T 13/565 |
| | | | | 60/547.1 |
| 2006/0097566 | A1 * | 5/2006 | Sommerfeld | B61H 13/04 |
| | | | | 303/3 |
| 2010/0102622 | A1 | 4/2010 | Favaretto | |
| 2010/0127560 | A1 * | 5/2010 | Mamei | B60T 13/22 |
| | | | | 303/2 |
| 2011/0175009 | A1 * | 7/2011 | Kristoffersen | F16K 15/063 |
| | | | | 251/321 |
| 2012/0152053 | A1 * | 6/2012 | Kondo | F16F 9/145 |
| | | | | 74/513 |
| 2013/0309619 | A1 * | 11/2013 | Tsai | F23D 14/68 |
| | | | | 137/550 |
| 2014/0246897 | A1 * | 9/2014 | Miyata | B60T 13/148 |
| | | | | 303/10 |
| 2014/0265543 | A1 | 9/2014 | Joyce et al. | |
| 2015/0075370 | A1 * | 3/2015 | Murayama | B23P 15/10 |
| | | | | 92/187 |
| 2015/0130264 | A1 * | 5/2015 | Isono | B60T 13/662 |
| | | | | 303/3 |
| 2015/0197228 | A1 * | 7/2015 | Isono | B60T 13/68 |
| | | | | 92/61 |
| 2015/0316081 | A1 * | 11/2015 | Giese | B60T 17/22 |
| | | | | 92/5 R |
| 2016/0153578 | A1 * | 6/2016 | Landrith, II | F16K 3/246 |
| | | | | 137/625.48 |
| 2018/0093648 | A1 * | 4/2018 | Pennala | B60T 7/06 |
| 2018/0201247 | A1 * | 7/2018 | Koshimizu | B60T 11/34 |
| 2020/0353908 | A1 * | 11/2020 | Street | G05G 1/38 |
| 2021/0164585 | A1 * | 6/2021 | Backes | F16K 11/0716 |
| 2022/0219652 | A1 * | 7/2022 | Tomhave | B60T 15/14 |

* cited by examiner

REVERSE MODULATION VALVE ASSEMBLY INCLUDING DEADBAND STATE

CROSS-REFERENCE TO RELATED APPLICATION

This application claims priority to and all advantages of U.S. application Ser. No. 62/942,053, filed on Nov. 29, 2019, the contents of which are incorporated herein by reference.

TECHNICAL FIELD

The present disclosure generally relates to a reverse modulation valve assembly including a deadband state and an active state, and systems including the same, for working units and other applications.

BACKGROUND

A wide variety of electrohydraulic proportional pressure control valves are used to provide controlled pressure to working units, such as wheel brakes. Some typical valves are designed for use with an actuator, such as a pedal actuator, in which force is applied to by a user. These pressure control valves provide a linear output characteristic for pressure versus force applied by the user to the actuator.

Various applications require a deadband in travel of the pedal actuator before actuation of the brakes occurs. The deadband is useful to compensate for the operator resting their foot on the brake pedal. The deadband is also useful when combined with a rotary position sensor to provide regenerative braking of the vehicle at low actuations of the pedal actuator on electric vehicles.

Conventional reverse pedal modulation valves require the addition of springs to the underside of the pedal, external to the valve, to provide a deadband functionality. These conventional valves are expensive to implement and the springs are susceptible to oxidations or contamination from the environment.

Accordingly, it is desirable to provide an improved reverse modulation valve and a system including the same. Furthermore, other desirable features and characteristics will become apparent from the subsequent summary and detailed description and the appended claims, taken in conjunction with the foregoing technical field and background.

BRIEF SUMMARY

In one embodiment, a valve assembly is provided. The valve assembly includes a valve body defining a bore. The valve assembly further includes a pull rod disposed in the bore and defining a bolt cavity. The pull rod is moveable between a first pull rod position and a second pull rod position. The valve assembly further includes a bolt disposed in the bolt cavity and moveable with respect to the pull rod between a first bolt position and a second bolt position. The valve assembly further includes a spool disposed in the bore. The spool is operatively coupled to the pull rod to move between an energized position and a neutral position.

In this and other embodiments, the bolt is configured to receive a force from a user to move the bolt from the first bolt position to the second bolt position. The bolt is also configured to receive the force from the user to move the pull rod from the first pull rod position to the second pull rod position when the bolt is in the second bolt position.

In this and other embodiments, the valve assembly has a deadband state and an active state. The valve assembly may be in the deadband state when the bolt is moving between the first bolt position and the second bolt position. In the deadband state, movement of the bolt does not result in movement of the spool. In contrast, the valve assembly may be in the active state when the bolt is in the second bolt position. In the active state, movement of the bolt results in movement of the pull rod thereby resulting in movement of the spool.

It is believed that the valve assembly including the bolt and the return spring disposed within the pushrod provides an improved deadband functionality as compared to conventional valve assemblies including an external spring to provide deadband functionality. In particular, in various embodiments, by disposing the bolt and the return spring within the pushrod and configuring the bolt to be moveable relative to the pushrod, these components are isolated from wear or contamination resulting from the environment.

BRIEF DESCRIPTION OF THE DRAWING(S)

Other advantages of the disclosed subject matter will be readily appreciated, as the same becomes better understood by reference to the following detailed description when considered in connection with the accompanying drawings wherein.

DETAILED DESCRIPTION

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

The following detailed description is merely exemplary in nature and is not intended to limit the invention or the application and uses of the invention. Furthermore, there is no intention to be bound by any theory presented in the preceding background or the following detailed description.

A valve assembly is provided herein. In various embodiments, the valve assembly is suitable for controlling a working unit of a vehicle. A system for controlling a working unit of a vehicle is also provided herein. Non-limiting examples of suitable vehicles include off-highway vehicles.

Figure 1:
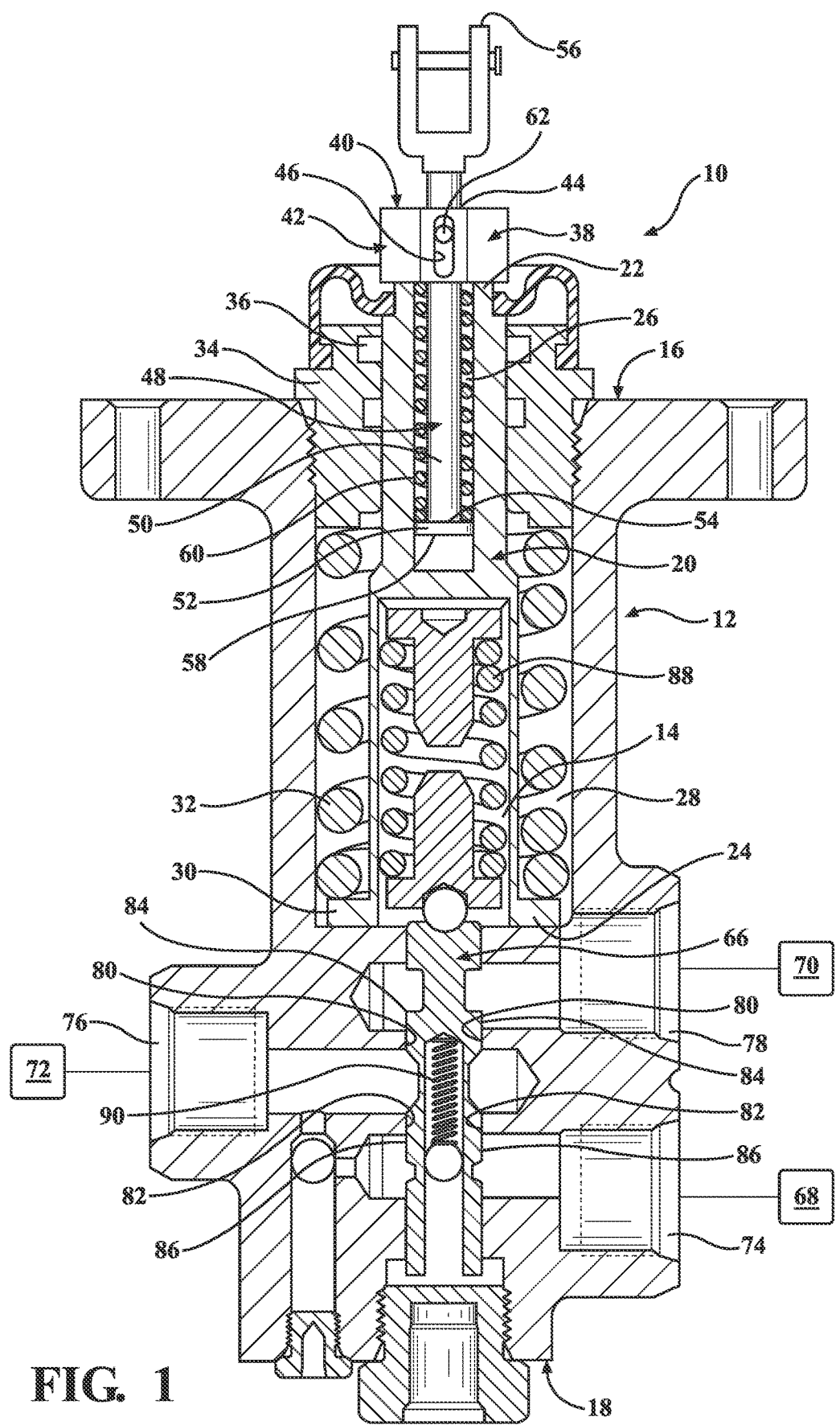
FIG. 1 is a cross-sectional plan views illustrating a non-limiting embodiment of a valve assembly.
Figure 2:
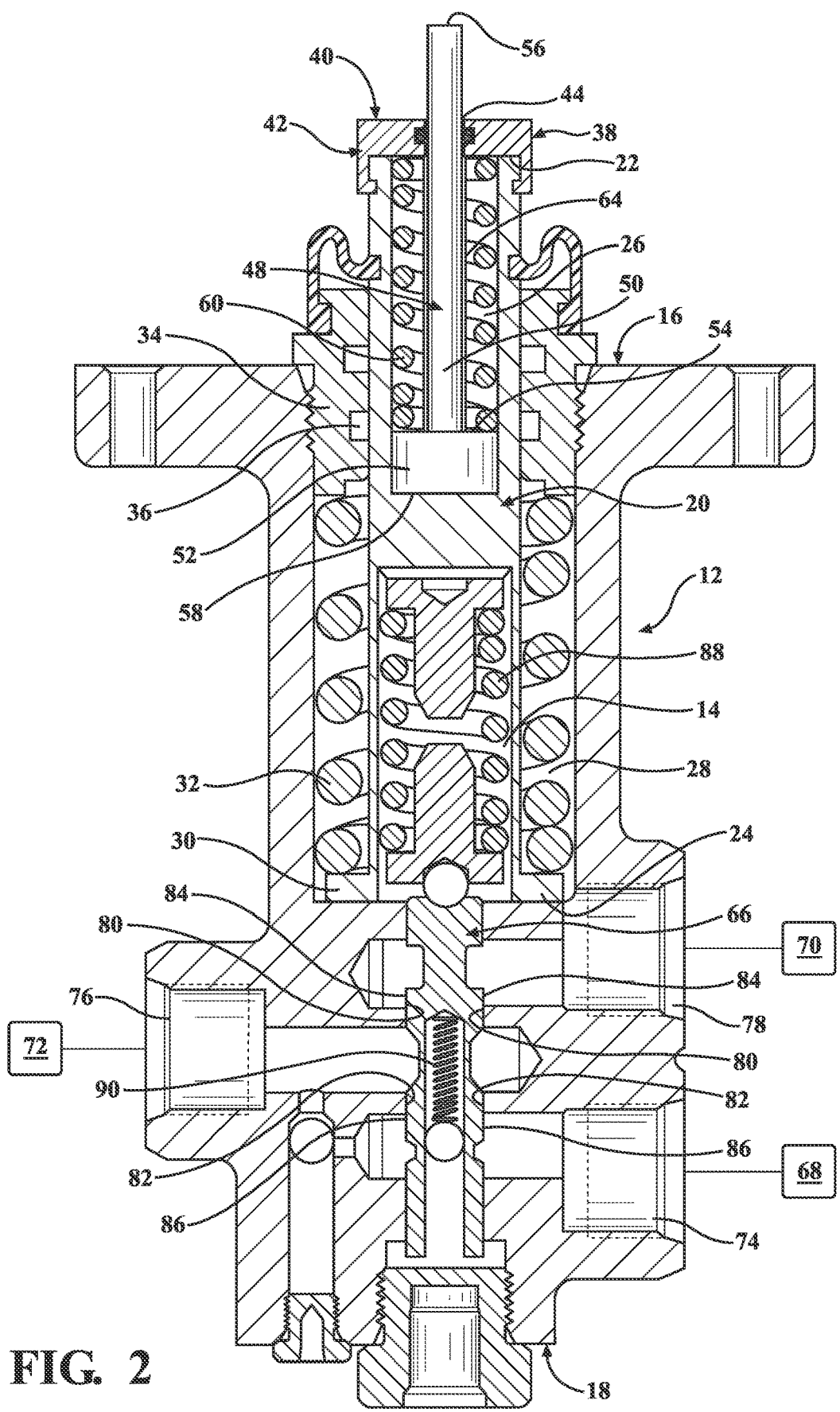
FIG. 2 is another cross-sectional plan view illustrating a non-limiting embodiment of the valve assembly.

FIGS. 1 and 2 are cross-sectional plan views illustrating a non-limiting embodiment of a valve assembly 10. In certain embodiments, the valve assembly 10 is further defined as a reverse modulation valve assembly. However, it is to be appreciated that the valve assembly 10 may be appropriate for any valve assembly wherein a pressure decrease actuates a working unit.

The valve assembly 10 includes a valve body 12 defining a bore 14. The bore 14 may be manufactured as a through bore extending through the valve body 12. It is contemplated that the bore 14 may also be configured as a blind bore. For purposes of clarification, the valve body 12 will be described as having a first body end 16 and a second body end 18. The valve assembly 10 further includes a cap 34 coupled to the first body end 16. The cap 34 may define a void 36 extending through the cap 34 to the bore 14. The cap 34 may be threaded to facilitate coupling of the cap 34 to the valve body 12.

The valve assembly 10 further includes a pull rod 20 disposed in the bore 14. The pull rod 20 may extend through the void 36 of the cap 34. The pull rod 20 has a first pull rod end 22 and a second pull rod end 24 opposite the first pull rod end 22. The pull rod 20 defines a bolt cavity 26 extending through the first pull rod end 22 and a compensating spring cavity 28 extending through the second pull rod end 24. The pull rod 20 includes a pull rod shoulder 30 extending laterally about the second pull rod end 24. As will be described in greater detail below, the pull rod 20 is operatively coupled to a spool 66 to facilitate operation of the valve assembly 10.

The pull rod 20 is moveable between a first pull rod position and a second pull rod position. In various embodiments, movement of the pull rod 20 to the first pull rod position is directed toward the second body end 18 and movement of the pull rod 20 to the second pull rod position is directed toward the first body end 16. The valve assembly 10 further includes a biasing spring 32 exhibiting a biasing spring force on the pull rod 20 to bias the pull rod 20 toward the first pull rod position. In various embodiments, the biasing spring 32 is disposed about the pull rod 20 and abutting the pull rod shoulder 30 of the pull rod 20 and the cap 34 to bias the pull rod 20 toward the first pull rod position.

In certain embodiments, the pull rod 30 includes a nut 38. The nut 38 may be coupled to the first pull rod end 22. In various embodiments, both of the nut 38 and the first pull rod end 22 may be threaded for facilitating coupling of the nut 38 and pull rod 30 together. The nut 38 may have a base 40 and a side 42 transverse to the base 40. The nut 38 may define a hole 44 having a hole diameter. The hole 44 may be defined on the base 40 of the nut 38 and extend through the nut 38 to the bolt cavity 26. The nut 38 may further define a slot 46 transverse to the hole 44. The slot 46 may be defined on the side 42 of the nut 38.

The valve assembly 10 further includes a bolt 48 disposed in the bolt cavity 26. The bolt 48 may have a shaft portion 50 extending to a head portion 52. The bolt 48 may have a bolt shoulder 54 spaced from the nut 38. The bolt shoulder 54 may be defined by a joint of the shaft portion 50 and the head portion 52. The bolt 48 may have a first bolt end 56 and a second bolt end 58 opposite the first bolt end 56 with the head portion 42 disposed at the second bolt end 58.

The bolt 48 is moveable with respect to the pull rod 20 between a first bolt position and a second bolt position. In various embodiments, movement of the bolt 48 to the first bolt position is directed toward the second body end 18 and movement of the bolt 48 to the second bolt position is directed toward the first body end 16. The valve assembly 10 may further include a return spring 60 exhibiting a return spring force on the bolt 48 to bias the bolt 48 toward the first bolt position. In various embodiments, the return spring 60 is disposed about the bolt 48, and between the nut 38 and the bolt shoulder 54 to bias the bolt 48 toward the first bolt position. In certain embodiments, the bolt 48 extends through the hole 44 and is moveable with respect to the nut 38.

In various embodiments, the bolt 48 is configured to move to the second bolt position prior to the pull rod 20 moving to the second pull rod position due to a ratio of the return spring force of the return spring 60 and the biasing spring force of the biasing spring 32. The return spring force of the return spring 60 may be less than the biasing spring force of the biasing spring 32 thereby resulting in the return spring 60 being at least partially compressed by movement of the bolt 48 prior to the biasing spring 32 being at least partially compressed by movement of the pull rod 20.

With specific reference to FIG. 1, in certain embodiments, the bolt 48 comprises a pin 62 configured to cooperate with the slot 46 of the nut 38 to limit movement of the bolt 48 with respect to the pull rod 20 between the first bolt position and the second bolt position. For example, as the bolt 48 moves from the first bolt position to the second bolt position, the pin 62 moves along the slot 46 toward the base 40 of the nut 38. When the pin 62 contacts the base 40 of the nut 38, the bolt 48 may be limited from moving any further with respect to the pull rod 20. In these embodiments, the position at which the pin 62 limits movement of the bolt 48 may be defined as the second bolt position. It is to be appreciated that the size of the pin 62 or the slot 46 may be adjusted to increase or decrease the amount movement permitted by the bolt 48 before moving the pull rod 20 (i.e., deadband as will be described below).

With specific reference to FIG. 2, in other embodiments, the bolt 48 comprises a shell 64 configured to cooperate with the nut 38 to limit movement of the bolt 48 with respect to the pull rod 20 between the first bolt position and the second bolt position. The shell 64 may have a shell diameter with the shell diameter being greater than the hole diameter of the hole 44. For example, as the bolt 48 moves from the first bolt position to the second bolt position, the shell 64 moves with the bolt 48 toward the base 40 of the nut 38. When the shell 64 contacts the base 40 of the nut 38, the bolt 48 may be limited from moving any further with respect to the pull rod 20. In these embodiments, the position at which the shell 64 limits movement of the bolt 48 may be defined as the second bolt position. It is to be appreciated that the length of the shell 64 may be adjusted to increase or decrease the amount movement permitted by the bolt 48 before moving the pull rod 20 (i.e., deadband).

In various embodiments, the bolt 48 is configured to receive a force from a user to move the bolt 48 from the first bolt position to the second bolt position. In these and other embodiments, the bolt 48 is also configured to receive the force from the user to move the pull rod 20 from the first pull rod position to the second pull rod position when the bolt 48 is in the second bolt position. The force may be provided to the bolt 48 by any apparatus understood in the art for actuating a valve including, but not limited to, a pedal actuator, a lever, and the like. For example, as the force is applied to the bolt 48 to move the bolt from the first bolt position to the second bolt position, the bolt 48 moves toward the first body end 16 of the valve body 12. When the bolt 48 reaches the second bolt position, the bolt 48 directly or indirectly contacts the nut 38 and the bolt 40 continues to move toward the first body end 16 of the valve body 12 to move the pull rod 20 from the first pull rod position to the second pull rod position. In one exemplary embodiment (e.g. as shown in FIG. 1), the bolt 48 indirectly contacts the nut 38 through the pin 62 to move the pull rod 20 from the first pull rod position to the second pull rod position. In another exemplary embodiment (e.g. as shown in FIG. 2), the bolt 48 indirectly contacts the nut 38 through the shell 64 to move the pull rod 20 from the first pull rod position to the second pull rod position.

As introduced above, the valve assembly 10 further includes a spool 66. The spool 66 is disposed in the bore 14 and operatively coupled to the pull rod 20 to move between an energized position and a neutral position. The valve assembly 10 may further include a first compensating spring 88 disposed between the pull rod 20 and the spool 66 for operatively coupling the pull rod 20 and the spool 66. In various embodiments, the first compensating spring 88 is disposed in the compensating spring cavity 28. The valve assembly 10 may further include a second compensating spring 90 disposed opposite the first compensating spring 88 for biasing against the first compensating spring 88. In various embodiments, movement of the pull rod 20 from the first pull rod position to the second pull rod position results in movement of the spool 66 from the energized position to the neutral position. Valve assemblies including a spool for facilitating operation are well understood in the art.

Figure 3:
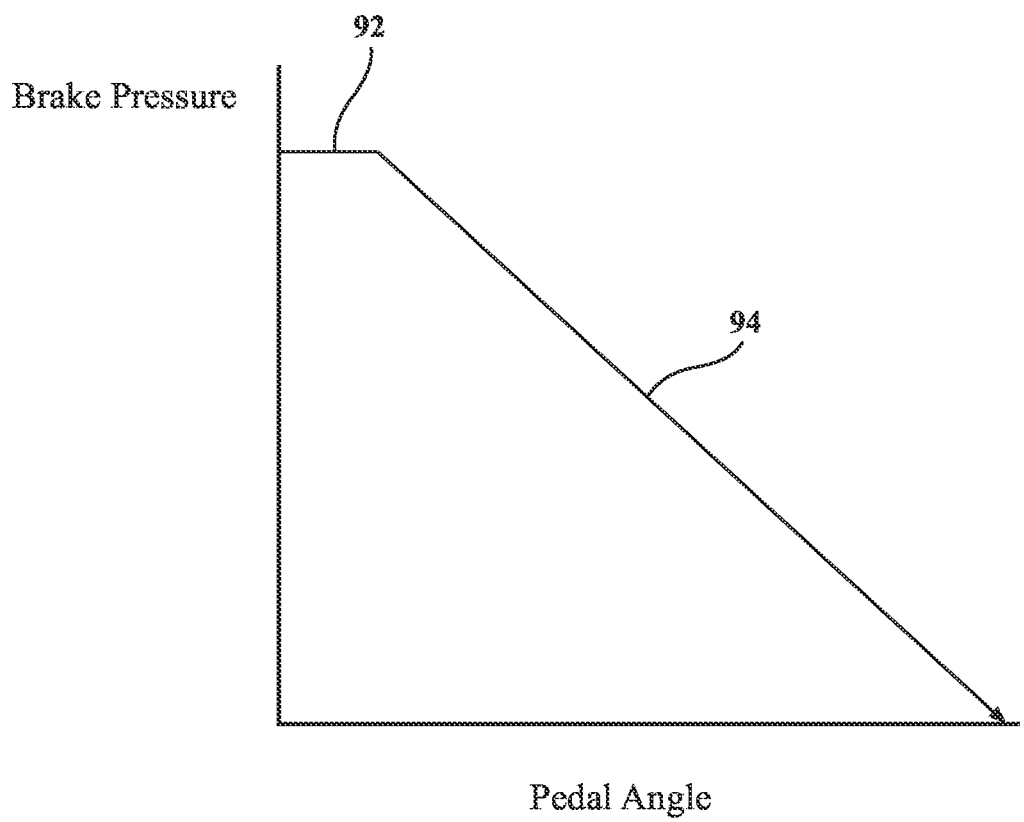
FIG. 3 is a graph illustrating states of a non-limiting embodiment of the valve assembly.

With reference to FIG. 3, in certain embodiments, the valve assembly 10 has a deadband state 92 and an active state 94. The valve assembly 10 may be in the deadband state 92 when the bolt 48 is moving between the first bolt position and the second bolt position. In the deadband state 92, movement of the bolt 48 does not result in movement of the spool 66. In contrast, the valve assembly 10 may be in the active state 94 when the bolt 48 is in the second bolt position. In the active state 94, movement of the bolt 48 results in movement of the pull rod 20 thereby resulting in movement of the spool 66. It is believed that the valve assembly 10 including the bolt 48 and the return spring 60 disposed within bolt cavity 26 of the pushrod 20 provides an improved deadband functionality to the valve assembly as compared to conventional valve assemblies including an external spring to provide deadband functionality. In particular, in various embodiments, by disposing the bolt 48 and the return spring 60 within the bolt cavity 26 of the pushrod 20 and configuring the bolt 48 to be moveable relative to the pushrod 20, the bolt 48 and the return spring 60 are isolated from wear or contamination resulting from the environment.

The deadband state 92 may be useful compensating for the user resting their foot on the pedal actuator. The deadband state 92 may also be useful to provide regenerative braking of the vehicle at low actuations of the pedal actuator on electric vehicles. In certain embodiments, the valve assembly 10 further includes a sensor (e.g. a rotary position sensor) adapted to determine position of the bolt 48 between the first bolt position and the second bolt position. In these and other embodiments, the sensor may activate the regenerative braking of the vehicle when the valve assembly 10 is in the deadband state 92.

Non-embodiments of operation of the valve assembly 10 will now be described. The valve assembly 10 is utilized with a fluid source 68 (e.g., hydraulic pressure unit or hydraulic pump), a tank 70 (e.g., a hydraulic reservoir), and a working unit 72 (e.g., a hydraulic cylinder or wheel brake). In various embodiments, the fluid source 68 is configured to provide fluid force (e.g. hydraulic fluid pressure) to the valve assembly 10. The valve body 12 defines a pressure port 74, a work port 76, and a tank port 78. Each of the ports 74, 76, and 78 may be in fluid communication with the bore 14 of the valve body 12. In certain embodiments, the ports 74, 76, and 78 provide connection locations for establishing fluid communication between the valve body 12 and the hydraulic pump 68, the working unit 72, and the tank 70. Typical port connections include standard SAE straight threads or other configurations for allowing hoses or other conduits to be connected between the components.

The bore 14 may include a first annular surface 80 and a second annular surface 82. These surfaces 80, 82 may be utilized to provide fluid communication between the ports 74, 76, and 78. In certain embodiments, the spool 66 includes a first annular portion 84 and a second annular portion 86. The first annular portion 84 and the second annular portion 86 may be configured to cooperate with the first annular surface 80 and the second annular surface 82 of the bore 14, respectively, for manipulating fluid communication between the ports 74, 76, and 78. As introduced above, in various embodiments, when the pull rod 20 is in the first pull rod position, the valve assembly 10 is energized and the working unit 72 is deactivated by providing fluid communication between the pressure port 74 and the work port 76. In these embodiments and other embodiments, when the pull rod 20 is in the second pull rod position, the valve assembly 10 is neutralized and the working unit 72 is activated by providing fluid communication between the work port 76 and the tank port 78.

As introduced above, a system for controlling the working unit 72 is also provided herein. The system has the deadband state 92 and the active state 94. The system includes a fluid source 68 configured to provide the fluid force. The system further includes the valve assembly 10 with the valve assembly 10 in fluid communication with the fluid source 16. The valve assembly 10 includes the pull rod 20 defining the bolt cavity 26. The pull rod 20 is moveable between the first pull rod position and the second pull rod position. The valve assembly 10 further includes the bolt 48 disposed in the bolt cavity 26 and moveable with respect to the pull rod 20 between the first bolt position and the second bolt position. The valve assembly 10 further includes the spool 66 operatively coupled to the pull rod 20 to move between an energized position and a neutral position.

The system further includes the working unit 72 in fluid communication with the valve assembly 10 and configured to deactivate in response to the fluid force. The system is in the deadband state 92 when the bolt 48 is between the first bolt position and the second bolt position. The system is in the active state 94 when the bolt 48 is in second bolt position.

In certain embodiments, the system further includes a pedal actuator operatively coupled to the bolt 48. The pedal actuator is adapted to receive the force from the user to move the bolt 48 from the first bolt position to the second bolt position. The pedal actuator is also adapted to receive the force from the user to move the pull rod 20 from the first pull rod position to the second pull rod position when the bolt 48 is in the second bolt position. The system further includes a sensor adapted to monitor movement of the pedal actuator.

Output from the sensor is used by the vehicle control system to do functions such as regenerative braking during the deadband state 92 of pull rod travel.

Although the invention has been described in connection with specific preferred embodiments, it should be understood that the invention as claimed should not be unduly limited to these specific embodiments. While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

INDUSTRIAL APPLICABILITY

While the present invention is not limited to a particular end application, use or industry, vehicles often rely on valve assemblies to provide fluid to working units, such as wheel brakes. The valve assembly is configured to move between a deadband state and an active state.

What is claimed is:

1. A valve assembly, comprising:
a valve body defining a bore;
a pull rod disposed in the bore and defining a bolt cavity, the pull rod moveable between a first pull rod position and a second pull rod position;
a bolt disposed in the bolt cavity and moveable with respect to the pull rod between a first bolt position and a second bolt position; and
a spool disposed in the bore, the spool operatively coupled to the pull rod to move between an energized position and a neutral position a nut disposed on an outer surface of the pull rod.

2. The valve assembly of claim 1, wherein the pull rod comprises a nut, the bolt has a bolt shoulder spaced from the nut, and a return spring is disposed between the nut and the bolt shoulder with the return spring exhibiting a return spring force on the bolt to bias the bolt toward the first bolt position.

3. The valve assembly of claim 2 further comprising a biasing spring exhibiting a biasing spring force on the pull rod to bias the pull rod toward the first pull rod position, wherein the bolt is configured to move to the second bolt position prior to the pull rod moving to the second pull rod position due to a ratio of the return spring force and the biasing spring force.

4. The valve assembly of claim 2, wherein the nut defines a hole having a hole diameter, the bolt extends therethrough and is moveable with respect to the nut.

5. The valve assembly of claim 4, wherein the nut define a slot transverse to the hole, the bolt comprises a pin configured to cooperate with the slot to limit movement of the bolt with respect to the pull rod between the first bolt position and the second bolt position.

6. The valve assembly of claim 4, wherein the bolt comprises a shell having a shell diameter, the shell diameter is greater than the hole diameter, and the shell is configured to cooperate with the nut to limit movement of the bolt with respect to the pull rod between the first bolt position and the second bolt position.

7. The valve assembly of claim 1, wherein the bolt is configured to receive a force from a user to move the bolt from the first bolt position to the second bolt position and to move the pull rod from the first pull rod position to the second pull rod position when the bolt is in the second bolt position.

8. The valve assembly of claim 1, wherein movement of the pull rod from the first pull rod position to the second pull rod position results in movement of the spool from the energized position to the neutral position.

9. The valve assembly of claim 1, wherein the valve assembly has a deadband state and an active state, the valve assembly is in the deadband state when the bolt is moving between the first bolt position and the second bolt position, and the valve assembly is in the active state when the bolt is in the second bolt position.

10. The valve assembly of claim 1 further comprising a first compensating spring disposed between the pull rod and the spool for operatively coupling the pull rod and the spool.

11. The valve assembly of claim 10 further comprising a second compensating spring disposed opposite the first compensating spring for biasing against the first compensating spring.

12. The valve assembly of claim 1, wherein the valve assembly is further defined as a reverse modulation valve assembly.

13. The valve assembly of claim 1 further comprising a sensor adapted to determine position of the bolt between the first bolt position and the second bolt position.

14. A system having a deadband state and an active state, the system comprising:
   a fluid source configured to provide a fluid force;
   a valve assembly in fluid communication with the fluid source, the valve assembly comprising;
      a pull rod defining a bolt cavity, the pull rod moveable between a first pull rod position and a second pull rod position,
      a bolt disposed in the bolt cavity and moveable with respect to the pull rod between a first bolt position and a second bolt position, and
      a spool operatively coupled to the pull rod to move between an energized position and a neutral position, and a nut disposed on an outer surface of the pull rod, and
   a working unit in fluid communication with the valve assembly and configured to deactivate in response to the fluid force;
   wherein the system is in the deadband state when the bolt is between the first bolt position and the second bolt position and the system is in the active state when the bolt is in second bolt position.

15. The system of claim 14, wherein movement of the pull rod from the first pull rod position to the second pull rod position results in movement of the spool from the energized position to the neutral position.

16. The system of claim 14, wherein the bolt is configured to receive a force from a user to move the bolt from the first bolt position to the second bolt position and to move the pull rod from the first pull rod position to the second pull rod position when the bolt is in the second bolt position.

17. The system of claim 16 further comprising a pedal actuator operatively coupled to the bolt, wherein the pedal actuator is adapted to receive the force from the user to move the bolt from the first bolt position to the second bolt position and to move the pull rod from the first pull rod position to the second pull rod position when the bolt is in the second bolt position.

18. The system of claim 17 further comprising a sensor adapted to monitor movement of the pedal actuator.

19. The system of claim 14, wherein the valve assembly is further defined as a reverse modulating valve assembly.

20. The system of claim 14, wherein the fluid source is configured to provide hydraulic fluid pressure.

* * * * *